United States Patent
She et al.

(10) Patent No.: US 11,518,501 B2
(45) Date of Patent: Dec. 6, 2022

(54) SYSTEM AND METHOD FOR REDUCING OXIDATION OF FRICTION DISKS

(71) Applicant: GOODRICH CORPORATION, Charlotte, NC (US)

(72) Inventors: Ying She, East Hartford, CT (US); Haralambos Cordatos, Colchester, CT (US); Zissis A. Dardas, Worcester, MA (US)

(73) Assignee: Goodrich Corporation, Charlotte, NC (US)

( * ) Notice: Subject to any disclaimer, the term of this patent is extended or adjusted under 35 U.S.C. 154(b) by 196 days.

(21) Appl. No.: 16/259,327

(22) Filed: Jan. 28, 2019

(65) Prior Publication Data

US 2020/0239130 A1 Jul. 30, 2020

(51) Int. Cl.
| | |
|---|---|
| *B64C 25/42* | (2006.01) |
| *F16D 65/00* | (2006.01) |
| *F16D 65/847* | (2006.01) |
| *F16D 55/36* | (2006.01) |
| *F16D 66/00* | (2006.01) |

(52) U.S. Cl.
CPC .............. *B64C 25/42* (2013.01); *F16D 55/36* (2013.01); *F16D 65/0025* (2013.01); *F16D 65/0037* (2013.01); *F16D 65/847* (2013.01); *F16D 2066/001* (2013.01)

(58) Field of Classification Search
CPC ........... F16D 65/0025; F16D 2035/786; F16D 65/0037; F16D 65/847
See application file for complete search history.

(56) References Cited

U.S. PATENT DOCUMENTS

| | | | | |
|---|---|---|---|---|
| 2,821,437 | A | * | 1/1958 | Lesher .................. F16D 65/847 188/264 E |
| 3,044,736 | A | | 7/1962 | Chambers |
| 4,014,410 | A | | 3/1977 | Bryant |
| 4,566,579 | A | | 1/1986 | Johnson |
| 4,592,452 | A | | 6/1986 | Merle |
| 4,771,822 | A | * | 9/1988 | Barbosa .................. B60C 23/18 165/41 |
| 4,883,023 | A | | 11/1989 | Tsang |

(Continued)

FOREIGN PATENT DOCUMENTS

| | | | | |
|---|---|---|---|---|
| DE | 4401846 | A1 * | 7/1995 | ........... F16D 65/092 |
| DE | 102020204498 | | 10/2021 | |

(Continued)

OTHER PUBLICATIONS

European Patent Office, European Search Report dated Jun. 18, 2020 in Application No. 19214970.6.

(Continued)

*Primary Examiner* — Thomas J Williams
(74) *Attorney, Agent, or Firm* — Snell & Wilmer L.L.P.

(57) ABSTRACT

A system, and associated method, for reducing oxidation of a friction disk may include a braking assembly comprising the friction disk and a conduit coupled to the braking assembly, with the conduit being in selectable fluid providing communication with the braking assembly. That is, the conduit may be configured to deliver inert fluid to the braking assembly, thus reducing the concentration of oxygen in the vicinity of the friction disks and thus reducing/mitigating oxidation of the friction disks.

20 Claims, 5 Drawing Sheets

(56) References Cited

U.S. PATENT DOCUMENTS

| | | | |
|---|---|---|---|
| 5,445,242 | A | 8/1995 | Pogorzelski |
| 6,170,617 | B1 | 1/2001 | Nakamura |
| 6,419,056 | B1 | 7/2002 | Dyko et al. |
| 7,255,208 | B2 | 8/2007 | Rea |
| 7,353,920 | B2 | 4/2008 | Nowak |
| 7,546,901 | B1 | 6/2009 | Hall |
| 8,074,932 | B2 | 12/2011 | Surawski |
| 8,151,951 | B2 | 4/2012 | Cornolti |
| 9,404,806 | B2 | 8/2016 | Miller |
| 9,573,567 | B2 | 2/2017 | Kirkbride et al. |
| 9,623,982 | B2 | 4/2017 | Sharma |
| 10,597,148 | B2 | 3/2020 | Meinel Cheesman et al. |
| 2003/0183454 | A1 | 10/2003 | Hall |
| 2004/0226438 | A1 | 11/2004 | Jones |
| 2010/0258385 | A1* | 10/2010 | Sabelstrom ............... B60T 5/00 188/71.6 |
| 2011/0147519 | A1 | 6/2011 | Scott |
| 2014/0239121 | A1* | 8/2014 | Kirkbride ............. F16D 65/847 244/103 R |
| 2014/0345991 | A1 | 11/2014 | Zywiak et al. |
| 2016/0200446 | A1 | 7/2016 | Sharma |
| 2016/0206995 | A1 | 7/2016 | Rugg et al. |
| 2016/0356331 | A1* | 12/2016 | Bill .......................... F04D 25/08 |
| 2017/0129331 | A1 | 5/2017 | Naitou |
| 2017/0227079 | A1 | 8/2017 | Grazebrook et al. |
| 2019/0112037 | A1 | 4/2019 | Meinel Cheesman et al. |
| 2019/0301554 | A1 | 10/2019 | Hosamane et al. |
| 2020/0300321 | A1* | 9/2020 | Cocks ..................... B64C 25/42 |

FOREIGN PATENT DOCUMENTS

| | | | | |
|---|---|---|---|---|
| EP | 1249631 | A2 * | 10/2002 | ........... F16D 65/847 |
| EP | 3320954 | | 5/2018 | |
| FR | 1240454 | | 9/1960 | |
| GB | 808229 | | 1/1959 | |
| GB | 2515063 | | 12/2014 | |
| JP | 2020069809 | A * | 5/2020 | |
| WO | WO-2017036766 | A1 * | 3/2017 | ............... B60T 5/00 |
| WO | 2018088915 | | 5/2018 | |

OTHER PUBLICATIONS

USPTO, Pre-Interview First Office Action dated Oct. 30, 2020 in U.S. Appl. No. 16/362,061.

C. Blanco*, J. Bermejo, H. Marsh, R. Menendez, Chemical and physical properties of carbon as related to brake performance, Received Jan. 1, 1996; accepted Sep. 16, 1997, Wear 213 (1997) 1-12.

M. Bevilacqua, A. Babutskyi, A. Chrysanthou, A review of the catalytic oxidation of carbonecarbon composite aircraft brakes, School of Engineering and Technology, University of Hertfordshire, College Lane, Hatfield, Herts AL10 9AB, UK, Received May 26, 2015, Received in revised form Aug. 20, 2015, Accepted Aug. 26, 2015 Available online Aug. 29, 2015.

European Patent Office, European Search Report dated May 28, 2020 in Application No. 19214542.3.

European Patent Office, European Office Action dated Feb. 25, 2021 in Application No. 19214542.3.

USPTO, Final Office Action dated Mar. 4, 2021 in U.S. Appl. No. 16/362,061.

USPTO, Advisory Action dated May 7, 2021 in U.S. Appl. No. 16/362,061.

USPTO, Notice of Allowance dated Jun. 9, 2021 in U.S. Appl. No. 16/362,061.

USPTO, Non-Final Office Action dated Sep. 7, 2022 in U.S. Appl. No. 17/410,740.

* cited by examiner

SYSTEM AND METHOD FOR REDUCING OXIDATION OF FRICTION DISKS

FIELD

The present disclosure relates to braking assemblies, and more specifically to extending the useable life of friction disks of a braking assembly.

BACKGROUND

Aircraft brake systems typically employ a series of friction disks forced into contact with each other to stop the aircraft. Friction disks splined to a non-rotating wheel axle are interspersed with friction disks splined to the rotating wheel. When these interleaved friction disks are pressed together during a braking actuation, significant heat is generated. Due to these high temperatures, friction disks (or at least wear surfaces thereof) are often constructed from carbon-carbon composite materials. While carbon-carbon composites are generally able to withstand the heat, the elevated temperatures of a braking action may cause the carbon-carbon composite material to undergo oxidation, which adversely affects the useable life of the friction disks.

SUMMARY

In various embodiments, the present disclosure provides a system for reducing oxidation of a friction disk. The system may include a braking assembly comprising the friction disk and a conduit coupled to the braking assembly, with the conduit being in selectable fluid providing communication with the braking assembly. That is, the conduit may be configured to deliver inert fluid to the braking assembly.

In various embodiments, delivery of the inert fluid to the braking assembly via the conduit supplants oxygen in a vicinity of the friction disk to reduce oxidation of the friction disk. In various embodiments, the conduit extends from an inert fluid source to the braking assembly. For example, the inert fluid may comprise a nitrogen-enriched air stream, and the source of the inert fluid may comprise a membrane configured to separate air into a nitrogen-enriched air stream and an oxygen-enriched air stream, according to various embodiments. In various embodiments, delivery of the inert fluid to the braking assembly via the conduit is actuated in response to determining a status of the braking assembly, wherein the status pertains to a likelihood of oxidation of the friction disk.

Also disclosed herein, according to various embodiments, is an aircraft that includes a braking assembly operatively coupled to a wheel assembly of a landing gear of the aircraft, with the braking assembly comprising a friction disk. The aircraft may also include a conduit coupled to the landing gear and configured to deliver inert fluid to the braking assembly.

In various embodiments, delivery of the inert fluid to the braking assembly via the conduit supplants oxygen in a vicinity of the friction disk to reduce oxidation of the friction disk. In various embodiments, the aircraft further includes an inert fluid source, with the conduit extending from the inert fluid source to the braking assembly. Still further, the aircraft may include an on-board fuel tank inerting system, with the inert fluid source being the on-board fuel tank inerting system. In various embodiments, the inert fluid includes a nitrogen-enriched air stream and the on-board fuel tank inerting system comprises a membrane configured to separate the nitrogen-enriched air stream from air.

In various embodiments, the inert fluid includes an oxygen lean gas stream. In various embodiments, delivery of the inert fluid to the braking assembly via the conduit is actuated in response to determining a status of the braking assembly. The status may pertain to a likelihood of oxidation of the friction disk. For example, the status may be a threshold aircraft speed, a threshold aircraft deceleration, a threshold temperature of the braking assembly, a threshold braking force, and/or an aircraft landing event, according to various embodiments.

Also disclosed herein, according to various embodiments, is a method for reducing oxidation of a friction disk of a braking assembly of an aircraft. The method may include determining a status of a braking assembly, wherein the status pertains to a likelihood of oxidation of the friction disk of the braking assembly. The method may also include, based on the status of the braking assembly, delivering an inert fluid to the braking assembly to reduce oxidation of the friction disk of the braking assembly.

In various embodiments, determining the status of the braking assembly is performed by a controller of an aircraft control system of the aircraft. In various embodiments, determining the status of the braking assembly comprises determining if an aircraft speed meets a threshold aircraft speed. In various embodiments, determining the status of the braking assembly comprises determining if an aircraft deceleration meets a threshold aircraft deceleration. In various embodiments, determining the status of the braking assembly comprises determining if a temperature of the braking assembly meets a threshold temperature of the braking assembly. In various embodiments, wherein determining the status of the braking assembly comprises determining if a braking force meets a threshold braking force. In various embodiments, determining the status of the braking assembly comprises determining a landing event of the aircraft.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Disclosed herein, according to various embodiments, are systems and methods for reducing oxidation of friction disks of braking assemblies. Generally, the systems and methods include delivering inert fluid, such as nitrogen gas or at least a nitrogen-enriched air stream, to a braking assembly in order to lower the concentration of oxygen in the vicinity of components of the braking assembly that experience elevated temperatures during braking. By lowering the concentration of oxygen (e.g., oxygen gas) in the vicinity of these components, oxidation of said components is mitigated. For example, delivering inert fluid to the braking assembly such that the oxygen concentration around the friction disks is decreased will decrease the rate and/or extent of oxidation of the friction disk. While numerous details and examples are included herein pertaining to reducing oxidation of friction disks of aircraft braking assemblies, the scope of the present disclosure is not necessarily limited to aircraft implementations, and thus the present disclosure may be utilized to reduce oxidation of friction disks in other applications.

As used herein, the term "inert fluid" refers to any oxygen-lean stream that, upon being delivered to friction disks, reduces the concentration of the oxygen in the vicinity and thus mitigates oxidation of said friction disks. Accordingly, the term "inert fluid" does not necessarily refer to a noble gas, but instead refers to a fluid stream that supplants oxygen in the vicinity of friction disks, thereby occupying volume that would otherwise have a higher oxygen content, thereby lowering the concentration of oxidant and lowering the rate/extent of oxidation. Said differently, the term "inert fluid" refers to a fluid stream that has less than 20%, by volume, of oxygen.

Figure 1:
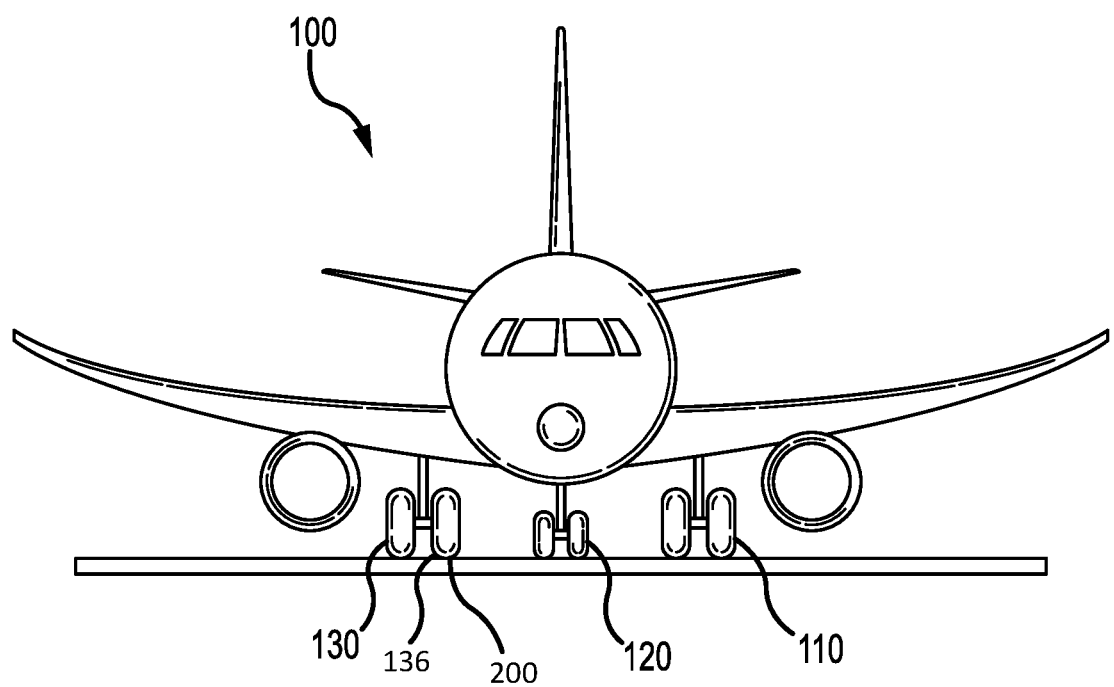
FIG. 1 illustrates an aircraft, in accordance with various embodiments.

In various embodiments, and with reference to FIG. 1, an aircraft 100 is provided. The aircraft 100 may include multiple landing gear, such as a first landing gear 110, a second landing gear 120 and a third landing gear 130. Each landing gear may include one or more wheel assemblies 200 (FIG. 1). For example, the third landing gear 130 may include an inner/inboard wheel assembly and an outer/outboard wheel assembly. The aircraft may also include one or more braking assemblies at each wheel assembly. The braking assembly, as described in greater detail below with reference to FIGS. 2A and 2B, may generally include a plurality of interleaved friction disks that may be actuated to exert a braking force to decelerate and/or stop the aircraft 100. Each wheel assembly of the aircraft 100 may be designed to receive a tire. For example, a tire 136 may be placed about an outer circumference of wheel assembly 200.

Figure 2A:
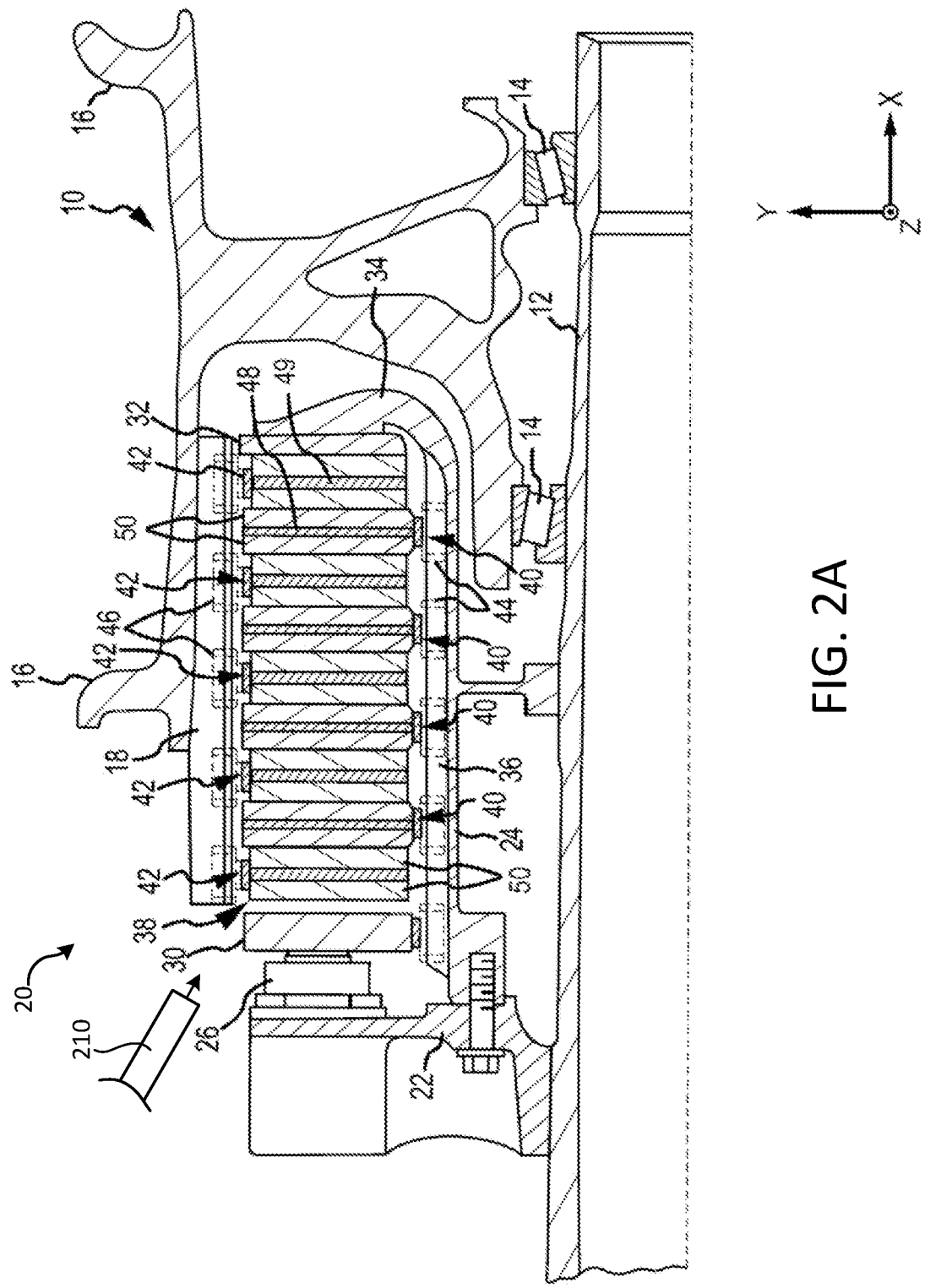
FIG. 2A illustrates a cross-sectional view of a multi-disk brake system, in accordance with various embodiments.
Figure 2B:
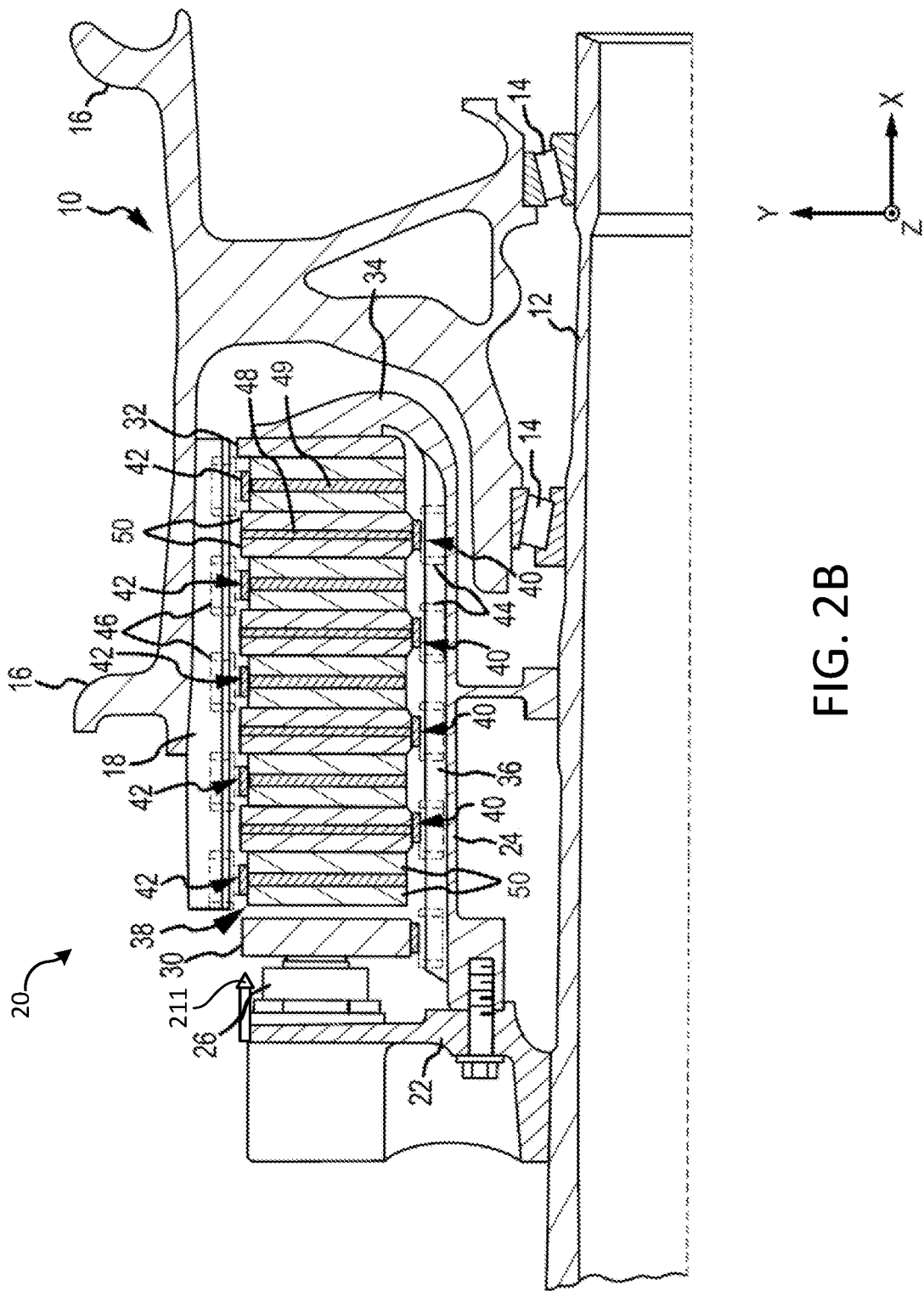
FIG. 2B illustrates a cross-sectional view of a multi-disk brake system, in accordance with various embodiments.

Referring to FIGS. 2A and 2B, a multi-disk braking assembly 20 is illustrated according to various embodiments. The braking assembly may be operatively mounted to the wheel assembly/landing gear of the aircraft 100. The braking assembly 20 may include a wheel 10 supported for rotation around axle 12 by bearings 14. Axle 12 defines an axis of multi-disk braking assembly 20 and the various components thereof described herein, and any reference to the terms axis and axial may include an axis of rotation defined by axle 12 or a dimension parallel to such axis. Wheel 10 includes rims 16 for supporting a tire, and a series of axially extending rotor splines 18 (one shown). Rotation of wheel 10 is modulated by multi-disk braking assembly 20. Multi-disk braking assembly 20 includes torque flange 22, torque tube 24, a plurality of pistons 26 (one shown), pressure plate 30, and end plate 32. Torque tube 24 may be an elongated annular structure that includes reaction plate 34 and a series of axially extending stator splines 36 (one shown). Reaction plate 34 and stator splines 36 may be integral with torque tube 24, as shown in FIGS. 2A and 2B, or attached as separate components.

Multi-disk braking assembly 20 also includes a plurality of friction disks 38. Each friction disk 38 may comprise a friction disk core. The plurality of friction disks 38 includes at least one friction disk with a non-rotatable core, also known as a stator 40, and at least one friction disk with a rotatable core, also known as a rotor 42. Stators 40 and rotors 42 may be located adjacent to one another in multi-disk braking assembly 20, forming a plurality of adjacent stator-rotor pairs. Stators 40 may comprise a stator core 48 and wear liners 50. Rotors 42 may comprise a rotor core 49 and wear liners 50. Each friction disk 38 includes an attachment structure. In the embodiment of FIGS. 2A and 2B, each of the four stators 40 includes a plurality of stator lugs 44 at circumferentially spaced positions around stator 40 as an attachment structure. Similarly, each of the five rotors 42 includes a plurality of rotor lugs 46 at circumferentially spaced positions around rotor 42 as an attachment structure. In the embodiment of FIGS. 2A and 2B, pressure plate 30, end plate 32, and friction disks 38 are all annular structures made at least partially from a carbon composite material.

Torque flange 22 may be mounted to axle 12. Torque tube 24 is bolted to torque flange 22 such that reaction plate 34 is near an axial center of wheel 10. End plate 32 is connected to a surface of reaction plate 34 facing axially inward. Thus, end plate 32 is non-rotatable by virtue of its connection to torque tube 24. Stator splines 36 support pressure plate 30 so that pressure plate 30 is also non-rotatable. Stator splines 36 also support stators 40 via stator cores 48. Stator cores 48 engage stator splines 36 with gaps formed between stator lugs 44. Similarly, rotors 42 engage rotor splines 18 via rotor core 49 with gaps formed between rotor lugs 46. Thus, rotor cores 49 of rotors 42 are rotatable by virtue of their engagement with rotor splines 18 of wheel 10.

As shown in FIGS. 2A and 2B, rotors 42 with rotor cores 49 are arranged with end plate 32 on one end, pressure plate 30 on the other end, and stators 40 with stator cores 48 interleaved so that rotors 42 with rotor cores 49 are directly or indirectly adjacent to non-rotatable friction components. Pistons 26 are connected to torque flange 22 at circumferentially spaced positions around torque flange 22. Pistons 26 face axially toward wheel 10 and contact a side of pressure plate 30 opposite friction disks 38. Pistons 26 may be powered electrically, hydraulically, or pneumatically.

In various embodiments, in response to actuation of pistons 26, a force, towards reaction plate 34, is exerted on the rotatable friction disks 42 and the non-rotatable friction disks 40. The rotatable friction disks 42 and the non-rotatable friction disks 40 may thus be pressed together between pressure plate 30 and end plate 32. This compression of the friction disks during a braking action often generates substantial heat. While frictions disks, or at least wear liners of friction disks, may be made from a material that is capable of withstanding the heat, such as carbon-carbon composite materials, the elevated temperature of the friction disks may render the disks susceptible to oxidation, which would reduce the useable life of the friction disks. Accordingly, the system and methods described below are configured to mitigate/reduce oxidation of the friction disks.

Figure 3:
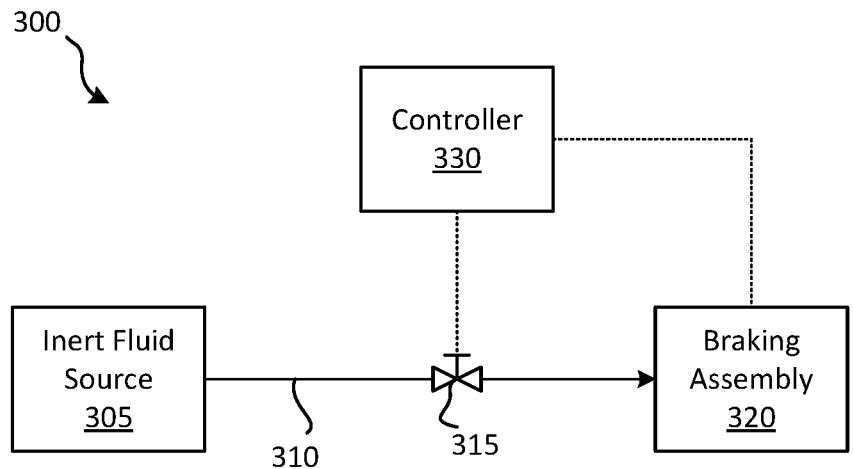
FIG. 3 is a schematic block diagram of a system for reducing oxidation of friction disks of a braking assembly, in accordance with various embodiments.

In various embodiments, and with reference to FIG. 3, a system 300 for reducing oxidation of a friction disk is provided. The system 300 may include a braking assembly 320 (e.g., braking assembly 20 of FIGS. 2A and 2B) and a conduit 310 configured to deliver inert fluid to the braking assembly 320 to reduce/mitigate oxidation of the braking assembly 320. More specifically, the braking assembly 320 may include a plurality of friction disks, and the conduit 310 may be configured to direct the inert fluid to the friction disks such that the rate/extent of oxidation is mitigated. Oxidation reduction occurs because delivery of the inert fluid to the braking assembly 320 via the conduit 310 supplants oxygen in a vicinity of the friction disk to reduce the concentration of oxidant around the friction disk, thereby at least reducing the rate/extent of oxidation. For example, FIG. 2A shows a conduit 210, which may be similar to conduit 310 of FIG. 3, that is coupled to the braking assembly 20 and that delivers inert fluid to the friction disks. In various embodiments, the conduit may include a nozzle 211 (FIG. 2B) that is coupled or otherwise mounted to the braking assembly 20. For example, the nozzle 211 may be coupled to torque flange 22. In various embodiments, the conduit/nozzle may extend through or be disposed along the torque tube 24 and may be configured to disperse fluid directly to the volume around the friction disks. In various embodiments, the braking assembly 20 may include a plurality of nozzles/conduits that are circumferentially distributed around the torque flange 22 so as to be able to equally distribute the inert fluid.

In various embodiments, the inert fluid may be nitrogen gas or other conventional inert fluids, such as helium, neon, argon. For example, the inert fluid may be a nitrogen-enriched air stream comprising less than 20 volume % of oxygen. In various embodiments, the inert fluid has a volume percent of oxygen of less than 15%. In various embodiments, the oxygen content in the inert fluid is less than 10 volume percent. However, as mentioned above, the inert fluid may not be a conventional inert gas (e.g., may not be a noble gas), and instead the inert fluid may be a fluid stream that has a reduced oxygen content. For example, carbon dioxide gas may serve as the inert fluid, at least under certain operating conditions (e.g., within certain temperature thresholds).

In various embodiments, the system 300 further includes a valve 315, a controller 330, and/or an inert fluid source 305. The inert fluid source 305 may be a storage vessel that holds inert fluid, or the inert fluid source 305 may generate inert fluid on-board the aircraft. For example, the inert fluid source 305 may comprise a membrane configured to separate air into an oxygen-enriched air stream and a nitrogen-enriched air stream, and the nitrogen-enriched air stream may be directed through the conduit 310 to the braking assembly 320. Additional details pertaining to on-board generation are included below with reference to FIG. 4.

The controller 330 is coupled in control providing communication with valve 315 disposed in the conduit 310, according to various embodiments. Generally, the controller 330 is configured to selectively control delivery of the inert fluid to the braking assembly. For example, delivery of the inert fluid to the braking assembly 320 via the conduit 310 may be actuated in response to determining a status of the braking assembly 320 (e.g., based on input and/or feedback from various sensors or other devices of the aircraft), wherein the status of the braking assembly 320 pertains to a likelihood of oxidation of the friction disk. Additional details pertaining to this determining step are provided below with reference to FIG. 5.

The controller 330 may be integrated into computer systems onboard aircraft such as, for example, a brake control unit (BCU), a full authority digital engine control (FADEC), an engine-indicating and crew-alerting system (EICAS), and/or the like. The controller 330 may also be a standalone computer system separate from aircraft and in electronic communication with aircraft, as described in further detail herein. The controller 330 may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof.

In various embodiments, the processor of the controller 330 may be configured to implement various logical operations in response to execution of instructions, for example, instructions stored on the non-transitory memory (e.g., tangible, computer-readable medium). As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Figure 4:
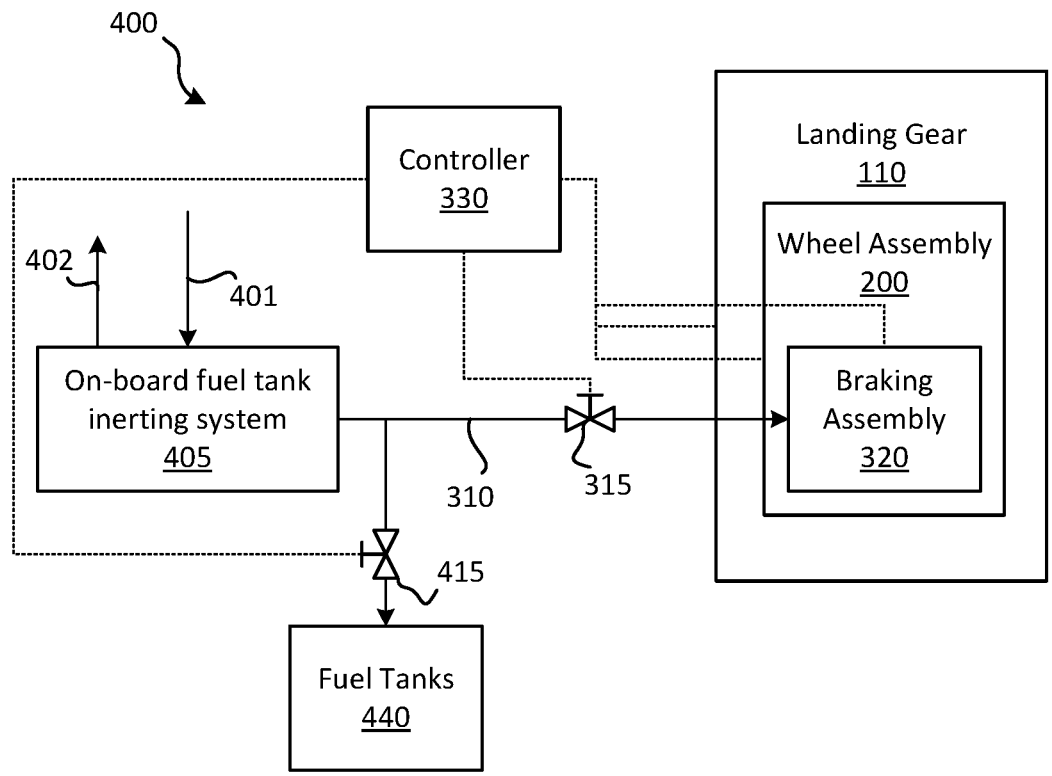
FIG. 4 is a schematic block diagram of a system for reducing oxidation of friction disks of a braking assembly, in accordance with various embodiments.

In various embodiments, and with reference to FIG. 4, a schematic block diagram of a portion of an aircraft 400 is provided. The aircraft 400 may include various components described above with reference to FIG. 3. The aircraft 400, according to various embodiments, also includes a landing gear 110, a wheel assembly 200 coupled to landing gear 110, and the braking assembly 320 coupled to the wheel assembly 200. In the aircraft 400, the inert fluid source 305 may be an on-board fuel tank inerting system 405 (also referred to herein simply as the "inerting system 405"). The on-board fuel tank inerting system 405 may generally be configured to provide inert gas, such as nitrogen gas, to the fuel tanks 440 of the aircraft 400 in order to keep the environment within the fuel tanks 440 below combustion levels as fuel is consumed. For example, the inerting system 405 may receive air through an inlet 401, and then may separate the air (e.g., using a membrane or other separator) to produce an oxygen rich stream and an oxygen lean stream. The oxygen rich stream may be routed through outlet 402 while the oxygen lean stream (e.g., less than 20 volume % of oxygen) may be routed through conduit 310.

In various embodiments, the inert fluid used to inert the fuel tanks 440 may be selectively directed, by actuating valve 315 and/or valve 415, to flow to the braking assembly 320 to reduce oxidation thereof. That is, the controller 330 may be configured to actively route all, or a portion of, the inert fluid intended for the fuel tanks 440 to instead flow to the braking assembly 320. As described in greater detail below with reference to FIG. 5, delivery of the inert fluid to the braking assembly 320 via the conduit 310 may be actuated in response to determining a status of the braking assembly, with the status of the braking assembly pertaining to a likelihood of oxidation of the friction disk. For example, the status may be a threshold aircraft speed, a threshold aircraft deceleration, a threshold temperature of the braking assembly, a threshold braking force, and/or an aircraft landing event, according to various embodiments.

In various embodiments, the conduit 310 may extend from the inert fluid source to one or all of the landing gear of an aircraft. In various embodiments, the conduit 310 includes various ducts or other passageways to help direct the inert gas from the source to the landing gear. In various embodiments, the conduit 310 extends through aircraft spaces, such as one or more cargo bays, through the fuselage, and/or through the wings of the aircraft to wing landing gear. In various embodiments, the outlet of the conduit 310 may include one or more nozzles configured to further control the direction and speed of the inert fluid delivered to the braking assembly.

Figure 5:
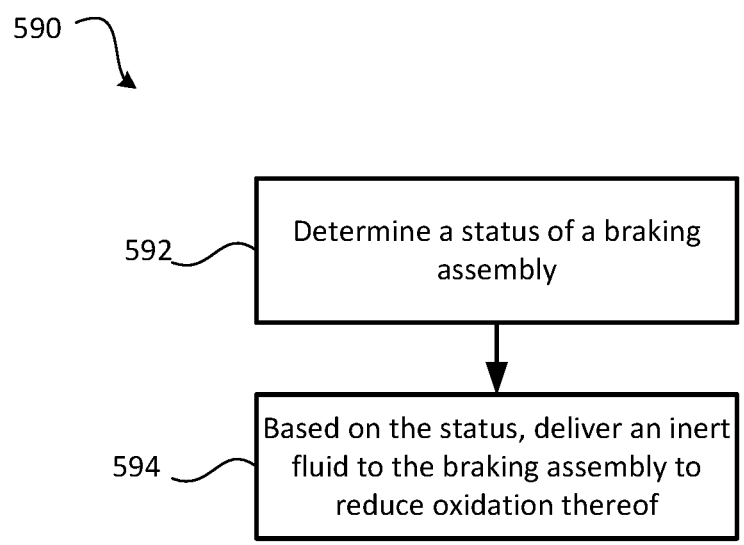
FIG. 5 is a schematic flow chart diagram of a method for reducing oxidation of friction disks of a braking assembly, in accordance with various embodiments.

In various embodiments, and with reference to FIG. 5, a method 590 for reducing oxidation of a friction disk of a braking assembly of an aircraft is provided. The method 590 may include determining a status of a braking assembly at step 592 and, based on the status of the braking assembly, delivering an inert fluid to the braking assembly to reduce oxidation of the friction disk of the braking assembly at step 594. The status of the braking assembly may generally pertain to a likelihood of oxidation of the friction disk of the braking assembly. Said differently, the determined status of the braking assembly may be a detected, sensed, or calculated condition of the aircraft that is indicative of whether oxidation would occur if not for delivery of the inert fluid using the system and components described above.

In various embodiments, determining the status of the braking assembly is performed by a controller of an aircraft control system of the aircraft. In various embodiments, determining the status of the braking assembly comprises determining if an aircraft speed meets a threshold aircraft speed. In various embodiments, determining the status of the braking assembly comprises determining if an aircraft deceleration meets a threshold aircraft deceleration. In various embodiments, determining the status of the braking assembly comprises determining if a temperature of the braking assembly meets a threshold temperature of the braking assembly. In various embodiments, wherein determining the status of the braking assembly comprises determining if a braking force meets a threshold braking force. In various embodiments, determining the status of the braking assembly comprises determining a landing event of the aircraft.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it may be within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for reducing oxidation of a friction disk, the system comprising:
   a braking assembly comprising the friction disk, the braking system being disposed in an aircraft; and
   a conduit coupled in selectable fluid providing communication with the braking assembly, wherein the conduit is configured to deliver inert fluid to the braking assembly to reduce oxidation of the friction disk, wherein the inert fluid comprises a nitrogen-enriched air stream and the inert fluid source comprises a membrane configured to separate the nitrogen-enriched air stream from air;
   wherein the conduit comprises a nozzle mounted to a radially outward edge of a torque flange of the braking assembly, wherein the nozzle is in fluid communication with the friction disk, and wherein the nozzle is oriented in an axial direction and is axially offset from the friction disk,
   wherein delivery of the inert fluid to the braking assembly via the conduit is actuated in response to determining a status of the braking assembly,
   wherein the status pertains to a likelihood of oxidation of the friction disk, and
   wherein the status comprises at least one of a threshold aircraft speed, a threshold aircraft deceleration, and a threshold braking force.

2. The system of claim 1, wherein the nozzle is a first nozzle of a plurality of nozzles circumferentially distributed around the torque flange.

3. The system of claim 1, wherein the nozzle is angled to direct the inert fluid in a radially inward direction.

4. The system of claim 1, wherein the nozzle is radially distal to the friction disk.

5. The system of claim 1, wherein the inert fluid comprises at least one of:
   a nitrogen-enriched air stream; and
   an oxygen lean gas stream.

6. The system of claim 5, wherein the at least one of:
   the nitrogen-enriched air stream has a volume percent of oxygen of less than 20%; and
   the oxygen lean gas stream has a volume percent of oxygen of less than 15%.

7. An aircraft comprising:
   a braking assembly operatively coupled to a wheel assembly of a landing gear of the aircraft, the braking assembly comprising a friction disk;
   a conduit coupled to a torque flange of the braking assembly of the landing gear, wherein the conduit is angled to direct inert fluid in a radially inward direction and comprises a nozzle mounted to a radially outward edge of the torque flange, wherein the nozzle is in fluid communication with the friction disk, wherein the nozzle is oriented in an axial direction and is axially offset from the friction disk, wherein the inert fluid comprises a nitrogen-enriched air stream;
   an on-board fuel tank inerting system configured to supply the inert fluid to the conduit, wherein the on-board fuel tank inerting system comprises a membrane configured to separate the nitrogen-enriched air stream from air; and
   a controller configured to determine a status of the braking assembly pertaining to a likelihood of oxidation of the friction disk, the controller configured to selectively control delivery of the inert fluid to the braking assembly to reduce oxidation of the friction disk based on the status of the braking assembly, the inert fluid being delivered via the conduit in response to determining if deceleration of the aircraft meets a threshold aircraft deceleration.

8. The aircraft of claim 7, wherein delivery of the inert fluid to the braking assembly via the conduit supplants oxygen in a vicinity of the friction disk.

9. The aircraft of claim 7, further comprising an inert fluid source, wherein the conduit extends from the inert fluid source to the braking assembly.

10. The aircraft of claim 7, wherein the nozzle is radially distal to the friction disk.

11. The aircraft of claim 7, wherein the inert fluid comprises an oxygen lean gas stream.

12. The aircraft of claim 7, wherein the controller is configured to selectively actuate the nozzle to selectively control at least one of a direction and speed of the inert fluid delivered to the braking assembly.

13. The aircraft of claim 7, wherein the status comprises at least one of a threshold aircraft speed, a threshold temperature of the braking assembly, a threshold braking force, and an aircraft landing event.

14. A method for reducing oxidation of a friction disk of a braking assembly of an aircraft, the method comprising:
   determining a status of the braking assembly, wherein determining the status of the braking assembly is performed by a controller of an aircraft control system of the aircraft, wherein determining the status of the braking assembly comprises determining if an aircraft deceleration meets a threshold aircraft deceleration, wherein the status pertains to a likelihood of oxidation of the friction disk of the braking assembly; and
   based on the status of the braking assembly, delivering an inert fluid to the braking assembly to reduce oxidation of the friction disk of the braking assembly, wherein delivering the inert fluid to the braking assembly comprises directing, by a nozzle mounted to a radially outward edge of a torque flange of the braking assembly, the inert fluid in a radially inward direction, relative to a rotational axis of the braking assembly, wherein the nozzle is in fluid communication with the friction disk.

15. The method of claim 14, wherein determining status of the braking assembly comprises determining a landing event of the aircraft.

16. The method of claim 14, wherein determining the status of the braking assembly comprises determining if a braking force meets a threshold braking force.

17. The method of claim 14, wherein determining the status of the braking assembly comprises determining if a temperature of the braking assembly meets a threshold temperature of the braking assembly.

18. A method for reducing oxidation of a friction disk of a braking assembly of an aircraft, the method comprising:
   determining a status of the braking assembly, wherein determining the status of the braking assembly is performed by a controller of an aircraft control system of the aircraft, wherein determining the status of the braking assembly comprises determining if an aircraft deceleration meets a threshold aircraft deceleration, wherein the status pertains to a likelihood of oxidation of the friction disk of the braking assembly; and
   based on the status of the braking assembly, delivering an inert fluid to the braking assembly to reduce oxidation of the friction disk of the braking assembly.

19. The method of claim 18, wherein determining the status of the braking assembly comprises at least one of:
   determining if a braking force meets a threshold braking force;
   determining if a temperature of the braking assembly meets a threshold temperature of the braking assembly; and
   determining a landing event of the aircraft.

20. The method of claim 18, wherein the inert fluid comprises at least one of:
   a nitrogen-enriched air stream, the nitrogen-enriched air stream having a volume percent of oxygen of less than 20%; and
   an oxygen lean gas stream, the oxygen lean gas stream having a volume percent of oxygen of less than 15%.

* * * * *